US012125053B2

(12) United States Patent
McClean et al.

(10) Patent No.: US 12,125,053 B2
(45) Date of Patent: *Oct. 22, 2024

(54) SYSTEMS AND METHODS FOR FORECASTING BASED ON CATEGORIZED USER MEMBERSHIP PROBABILITY

(71) Applicant: Yahoo Ad Tech LLC, Dulles, VA (US)

(72) Inventors: John McClean, Dublin (IE); Tony Finn, Dublin (IE); Jiji Sasidharan, Dublin (IE)

(73) Assignee: Yahoo Ad Tech LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,648

(22) Filed: Sep. 27, 2022

(65) Prior Publication Data

US 2023/0015413 A1    Jan. 19, 2023

Related U.S. Application Data

(63) Continuation of application No. 15/685,512, filed on Aug. 24, 2017, now Pat. No. 11,488,183.

(51) Int. Cl.
*G06Q 30/00* (2023.01)
*G06Q 30/0202* (2023.01)
(Continued)

(52) U.S. Cl.
CPC ..... *G06Q 30/0202* (2013.01); *G06Q 30/0244* (2013.01); *G06Q 30/0246* (2013.01);
(Continued)

(58) Field of Classification Search
None
See application file for complete search history.

(56) References Cited

U.S. PATENT DOCUMENTS 10,318,510 B2 * 6/2019 Turner ............... G06F 16/24542
11,080,745 B2 * 8/2021 Sinha ................. G06Q 30/0201
(Continued)

OTHER PUBLICATIONS

Manoj Debnath, Exploring Java BitSet, Jul. 13, 2016, www.developer.com (Year: 2016).*
(Continued)

*Primary Examiner* — Naresh Vig
(74) *Attorney, Agent, or Firm* — Bookoff McAndrews, PLLC

(57) ABSTRACT

Systems and methods are disclosed for determining an estimate of available user impressions on a network, comprising receiving a request for an estimate of available user impressions for viewing one or more media elements on a network, the request comprising one or more viewer demographic group limitations. A request may be received to include deterministic users and probabilistic users in the estimate of available user impressions. A number of deterministic users may be determined based on query results from a deterministic user data set. A number of probabilistic users may be determined based on query results from a probabilistic user data set, and the estimate of available user impressions may be determined based on the number of deterministic users and the number of probabilistic users.

20 Claims, 5 Drawing Sheets

(51) Int. Cl.
*G06Q 30/0241* (2023.01)
*G06Q 30/0242* (2023.01)
*H04L 67/50* (2022.01)
*H04L 67/306* (2022.01)

(52) U.S. Cl.
CPC ....... *G06Q 30/0249* (2013.01); *H04L 67/535* (2022.05); *H04L 67/306* (2013.01)

(56) References Cited

U.S. PATENT DOCUMENTS

| | | |
|---|---|---|
| 2006/0155567 A1 | 7/2006 | Walker et al. |
| 2010/0114710 A1 | 5/2010 | Agarwal et al. |
| 2010/0318413 A1* | 12/2010 | Zinkevich .............. G06Q 30/02 705/14.4 |
| 2011/0251875 A1* | 10/2011 | Cosman ............. G06Q 30/0277 705/7.31 |
| 2012/0066712 A1 | 3/2012 | Schultz |
| 2012/0239468 A1* | 9/2012 | Yerneni .............. G06Q 30/0241 705/14.4 |
| 2013/0124315 A1 | 5/2013 | Doughty et al. |
| 2014/0337513 A1 | 11/2014 | Amalapurapu et al. |
| 2015/0025962 A1 | 1/2015 | Becket et al. |
| 2015/0046477 A1 | 2/2015 | Gershteyn |
| 2015/0142513 A1 | 5/2015 | Shnayder et al. |
| 2015/0242906 A1 | 8/2015 | Liu et al. |
| 2015/0278239 A1* | 10/2015 | Colt .................... G06F 16/2237 707/693 |
| 2015/0348066 A1 | 12/2015 | Sewak |
| 2016/0019580 A1 | 1/2016 | Rao et al. |
| 2016/0027055 A1 | 1/2016 | Dixon et al. |
| 2016/0239868 A1 | 8/2016 | Demsey et al. |
| 2016/0314491 A1* | 10/2016 | Shani ................. G06Q 30/0275 |
| 2017/0034591 A1 | 2/2017 | Ray et al. |
| 2017/0155956 A1 | 6/2017 | Rao et al. |

OTHER PUBLICATIONS

Bit Array, Feb. 14, 2017, Wikipedia, printed through www.archive.org (2017).

Kris Wenzel, How Do I Combine Results From More Than One Table, Nov. 25, 2016, www.essentialsql.com printed through www.archive.org (2016).

Manoj Debnath, Exploring Java Bitset, Jul. 13, 2016, www.developer.com (2016).

* cited by examiner

300

| ALL CAMPAIGNS/ 888 HOLDINGS, VIDEO EU, 2014 | / TOYOTA INTENDERS DATA ELEMENT GROUP I |

NEW DATA ELEMENT

| DATA ELEMENT SUMMARY | GENERAL | INVENTORY | TARGETING | CREATIVES | BID & OPTIMIZATION |

GENERAL OPTIONS

- 305 — STATUS ⦿ PAUSED ○ LIVE
- 310 — DATA ELEMENT NAMES* [NEW DATA ELEMENT]
- 315 — DATA ELEMENT GROUP [TOYOTA INTENDERS DATA ELEMENT GROUP I]
- NOTES [ ]
- 320 { START #1* [📅▼] [MM/DD/YYYY] [🕐] [12:00 AM] ET
       END #1* [📅▼] [MM/DD/YYYY] [🕐] [11:59 PM] ET
- 325 — [+ FLIGHT]
- 330 — GOAL #1* [# OF IMPRESSIONS] [IMPRESSIONS]
- 335 — [+ GOAL]
- 304 — MINIMUM GOAL ⦿ YES ○ NO
       [# OF IMPRESSIONS] [IMPRESSIONS] [TOTAL]

*FIG. 3*

SYSTEMS AND METHODS FOR FORECASTING BASED ON CATEGORIZED USER MEMBERSHIP PROBABILITY

CROSS-REFERENCE TO RELATED APPLICATION(S)

This patent application is a continuation of and claims the benefit of priority to U.S. application Ser. No. 15/685,512, filed on Aug. 24, 2017, the entirety of which is incorporated herein by reference.

TECHNICAL FIELD

The disclosure generally relates to the field of data element impression forecasting. More specifically, the disclosure relates to data element impression forecasting based on categorized user membership probability.

BACKGROUND

Producers of online videos and other data elements (e.g., electronic or online creatives in various media formats) promoting products and/or services may have a limited budget. Based on limited data, the producers may choose to use one promotional data element more often than another, but this decision is often based on subjective feelings about the merits of the data element's content.

Producers may wish to allocate resources based upon objective forecasting of available user impressions based upon collected user data on one or more networks. However, such forecasting may be slow, and may fail to integrate varying degrees of certainty about user identity.

SUMMARY OF THE DISCLOSURE

Methods may be disclosed for determining an estimate of available user impressions on a network, comprising receiving a request for an estimate of available user impressions for viewing one or more media elements on a network, the request comprising one or more viewer demographic group limitations. A request may be received to include deterministic users and probabilistic users in the estimate of available user impressions. A number of deterministic users may be determined based on query results from a deterministic user data set. A number of probabilistic users may be determined based on query results from a probabilistic user data set, and the estimate of available user impressions may be determined based on the number of deterministic users and the number of probabilistic users.

Systems may be disclosed for determining an estimate of available user impressions on a network, comprising a data storage device storing instructions for determining an estimate of available user impressions on a network, and a processor configured to execute the instructions to perform a method comprising receiving a request for an estimate of available user impressions for viewing one or more media elements on a network, the request comprising one or more viewer demographic group limitations. A request may be received to include deterministic users and probabilistic users in the estimate of available user impressions. A number of deterministic users may be determined based on query results from a deterministic user data set. A number of probabilistic users may be determined based on query results from a probabilistic user data set, and the estimate of available user impressions may be determined based on the number of deterministic users and the number of probabilistic users.

A non-transitory computer readable medium storing instructions that, when executed by a processor, cause the processor to perform a method of determining an estimate of available user impressions on a network, the method comprising receiving a request for an estimate of available user impressions for viewing one or more media elements on a network, the request comprising one or more viewer demographic group limitations. A request may be received to include deterministic users and probabilistic users in the estimate of available user impressions. A number of deterministic users may be determined based on query results from a deterministic user data set. A number of probabilistic users may be determined based on query results from a probabilistic user data set, and the estimate of available user impressions may be determined based on the number of deterministic users and the number of probabilistic users.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF DRAWINGS

The accompanying drawings, which are incorporated in and constitute a part of this specification, illustrate various exemplary embodiments and together with the description, serve to explain the principles of the disclosed embodiments.

FIG. 3 is an example user interface enabling the creation and/or selection of data elements.

DETAILED DESCRIPTION

Reference will now be made in detail to the exemplary embodiments of the disclosure, examples of which are illustrated in the accompanying drawings. Wherever possible, the same reference numbers will be used throughout the drawings to refer to the same or like parts.

Figure 1:
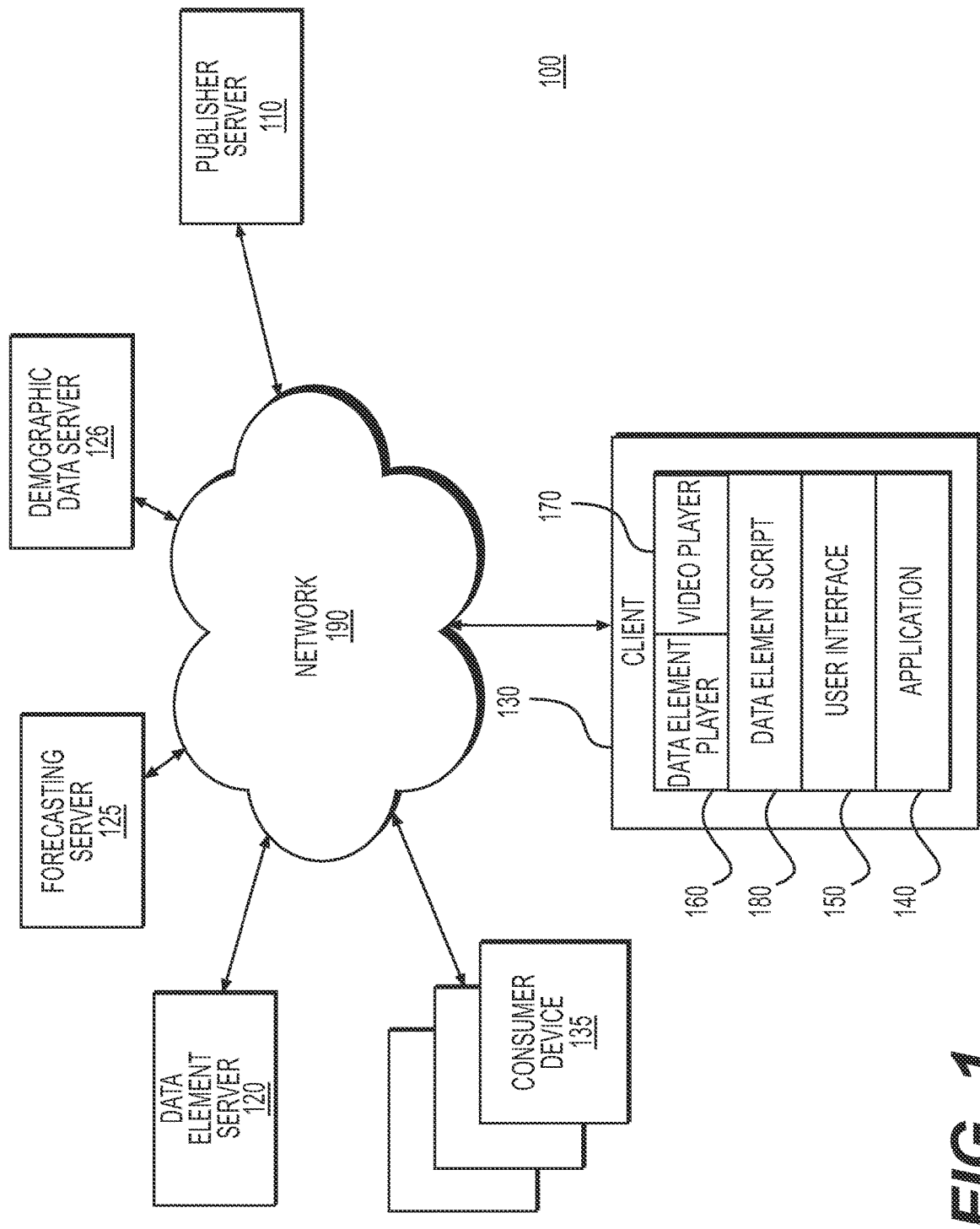
FIG. 1 is a high-level block diagram illustrating a system for dynamically optimizing the use of data elements in accordance with objectives and constraints.

FIG. 1 is a high-level block diagram of a computing environment 100 for data element impression forecasting based on categorized user membership probability according to techniques presented herein. The computing environment 100 may include any number of publisher servers 110, any number of data element servers 120 (for example, an "ad server"), any number of forecasting servers 125, any number of demographic data servers 126, any number of consumer devices 135, and any number of client devices 130 communicatively coupled by a network 190, such as the Internet. In one embodiment, the publisher server 110, the data element server 120, the forecasting server 125, and/or the demographic data server 126 may be web servers. In another embodiment, the publisher server 110, forecasting server 125, and/or demographic data servers 126 may be application servers that provide an instance of one or more applications 140 to the client device 130. In yet another embodiment, the publisher server 110, data element server 120, forecasting server 125, and/or demographic data server 126 may provide data to support the execution of the one or more applications 140 on the client 130. The client device 130 is a computer or other electronic device that may be used by one or more users to perform activities, which may include browsing web pages on the network 190, or using the one or more applications 140. The client device 130, for example, may be a personal computer, laptop, tablet, smart device, personal digital assistant (PDA), or a mobile telephone. Only one publisher server 110, one data element server 120, forecasting server 125, one demographic data server 126, and one client device 130 are shown in FIG. 1 in order to simplify and clarify the description. Other embodiments of the computing environment 100 may include any number of publisher servers 110, data element servers 120, forecasting servers 125, demographic data servers 126, and/or client devices 130 connected to the network 190. Further, while the publisher server 110, data element server 120, forecasting server 125, and demographic data server 126 are depicted as separate in the example of FIG. 1, the features of the publisher server 110, data element server 120, forecasting server 125, and demographic data server 126 may be variously integrated into a smaller or greater number of devices on the network 190. The forecasting server 125 and demographic data server 126 may store and/or provide information that may be used to target and/or gather data about the activities of users, as will be discussed further herein. The forecasting server 125 may forecast any number of metrics related to user availability, user behavior, and/or the performance of data elements presented to users. One or more additional servers in system 100 may monitor, gather, and/or process data regarding the performance of data elements presented to users.

The network 190 represents the communication pathways between (e.g., communicatively coupled) the publisher server 110, data element server 120, forecasting server 125, demographic data server 126, and/or client device 130. In one embodiment, the network 190 is the Internet. The network 190 may also include dedicated or private communications links that are not necessarily a part of the Internet. In one embodiment, the network 190 uses various communications technologies and/or protocols. Thus, the network 190 may include links using technologies such as Ethernet, 802.11, integrated services digital network (ISDN), digital subscriber line (DSL), asynchronous transfer mode (ATM), etc. Similarly, the networking protocols used on the network 190 may include the transmission control protocol/Internet protocol (TCP/IP), the hypertext transport protocol (HTTP), the simple mail transfer protocol (SMTP), the file transfer protocol (FTP), etc. The data exchanged over the network 190 can be represented using technologies and/or formats including the hypertext markup language (HTML), the extensible markup language (XML), etc. In addition, all or some of links may be encrypted using encryption technologies such as the secure sockets layer (SSL), transport layer security (TLS), secure HTTP (HTTPS), and/or virtual private networks (VPNs). In another embodiment, the entities may use custom and/or dedicated data communications technologies instead of, or in addition to, the ones described above.

As shown in FIG. 1, client device 130 may execute an application 140, such as a web application or browser, that allows a user to retrieve and view content stored on other computers or servers on the network 190. The application 140 may also allow the user to submit information to other computers on the network 190, such as through user interfaces 150, web pages, application program interfaces (APIs), and/or other data portals. In one embodiment, the application 140 is a web browser, such as MICROSOFT INTERNET EXPLORER or MOZILLA FIREFOX. The application 140 may support technologies including JavaScript, ActionScript, and other scripting languages that allow the client device 130 to perform actions in response to scripts and other data sent to the application via the network 190. The application 140, as further discussed herein, may also utilize data and/or other services from forecasting server 125. In some embodiments, functions ascribed herein to the application 140 are implemented via plug-ins such as ADOBE FLASH. In some embodiments, the application 140 may present a demand-side platform ("DSP") to users (which may be authorized users), which enables would-be advertisers or agents thereof to purchase ad space. Although the application 140 is depicted in FIG. 1 as on client device 130, the application 140 may be partially or completely executed on forecasting server 125.

Any number of consumer devices 135 may also connect to the network 190, which may enable consumers of network content to view data elements such as advertisements, or other third party content, distributed using the application 140. While the client device 130 is depicted as having a data element player 160, video player 170, and data element script 180, these entities and more may be present on any or all of the consumer devices 135. In addition, many of the attributes and behavior of a client device 130 may be also present or implemented on the consumer device 135.

The publisher server 110 may deliver data associated with a user interface 150, such as a web page, to the application 140 over the network 190. The publisher server 110 may also communicate with forecasting server 125, and act as a relay for information between the application 140 and the forecasting server 125, including information which may be utilized when rendering a user interface 150. The application 140 may then load the user interface 150 and present it to the user. User interface 150 may correspond to any of the user interfaces discussed herein, and any of the user interfaces which may be displayed by application 140. The user interface 150 may include a video player 170 for presenting online videos and a data element player 160, which may, for example, present electronic advertisements and/or other promotional materials to the user of client device 130 and/or consumer using the consumer device 135. The data element player 160 may be used to display any of the data elements discussed herein to a user. The video player 170 may be any video player suitable for online video such as WINDOWS MEDIA PLAYER, REALPLAYER, QUICKTIME, WINAMP, or any number of custom video players built to run on a suitable platform such as the Adobe Flash platform.

The data element player 160 may comprise JavaScript, ActionScript and/or other code executable by the application 140 that may be delivered to the client device 130 in addition to or as part of the user interface 150. A data element script 180 may contain code readable and/or transformable by the data element player 160 into operational instructions that govern behavior of the data element player 160. The application may execute the data element player 160 natively, directly (e.g., as JavaScript) or via a browser plug-in module (e.g., as a Flash plug-in). The data element player 160 may communicate with the data element server 120 over the network 190 to request and receive content for presentation on the client device 130. A data element may comprise any computer-executable code (e.g., JavaScript, ActionScript, Flash, or HTML) whose execution may result in the presentation of text, images, and/or sounds to the user. The text, images, and/or sounds may promote one or more products, services, viewpoints and/or actions. A data element can be a linear data element (i.e., promotional content that interrupts the presentation of a video) or a non-linear data element (i.e., promotional content that is presented concurrently with a video) presented either before, during, or after the video. A data element, which may also be termed a media element, can also be textual, graphical (such as a banner promotion), or a video promotion. A data element can be presented as overlaying the online video or in any other position within the user interface 150. A data element can also be interactive and, in one embodiment, a data element can transition from one of the aforementioned varieties of promotional data elements to a different variety or trigger an additional data element in response to an action by the user of client 130 or consumer using a consumer device 135.

The demographic data server 126 may provide user targeting data, user behavior data, demographic data, and user segment data to the forecasting server 125 and/or client 130, such as to application 140. The demographic data server 126 may be provided with one or more user identifiers, and in return provide data associated with the one or more user identifiers.

As will be discussed further herein, software code may be associated with, or embedded in, advertisements, articles, videos, audio, or any form of consumer multimedia. The user behavior data may be used for analyzing the behavior of the users of electronic devices, and may further be used to analyze consumer behavior in order to optimize presentation of content. Using the user behavior data and/or historical data, that may be determined by querying the demographic data server 126, and any applied weights, a forecasted return on investment ("ROI"), available impressions, or other metrics may be calculated. The ROI and other metric calculations may be based on costs, such as in advertising costs, and user behavior data, such as conversion data.

Figure 2:
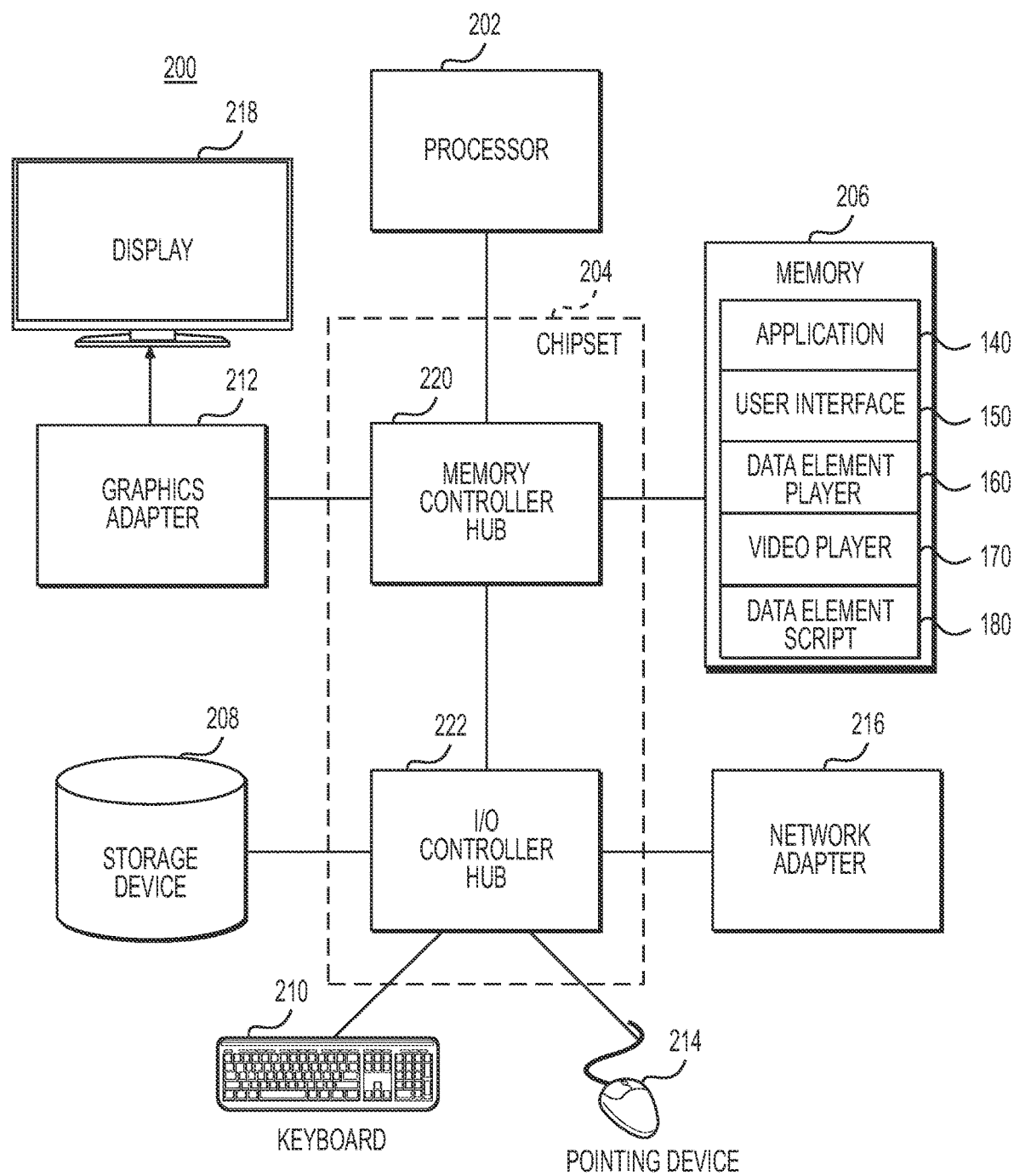
FIG. 2 is a high-level block diagram illustrating an example of a computer for use as a server and/or as a client according to techniques presented herein.

FIG. 2 is a high-level block diagram illustrating on example of a computer 200 for use as a client device 130, consumer device 135, and/or as a server, such as a publisher server 110, a data element server 120, or an forecasting server 125. Illustrated are at least one processor 202 coupled to a chipset 204. The chipset 204 may include a memory controller hub 220 and/or an input/output (I/O) controller hub 222. A memory 206 and a graphics adapter 212 may be coupled to the memory controller hub 220, and a display 218 is coupled to the graphics adapter 212. A storage device 208, keyboard 210, pointing device 214, and network adapter 216 may be coupled to the I/O controller hub 222. Other embodiments of the computer 200 have different architectures. For example, the memory 206 may be directly coupled to the processor 202 in some embodiments.

The computer 200 may be adapted to execute computer program modules for providing the functionality described herein. As used herein, the term "module" refers to computer program logic configured and used to provide the specified functionality. Thus, a module can be implemented in hardware, firmware, and/or software. In one embodiment, program modules are stored on the storage device 208, loaded into the memory 206, and executed by the processor 202. The storage device 208 is a computer-readable storage medium such as a hard drive, compact disk read-only memory (CD-ROM), DVD, or a solid-state memory device. The memory 206 is also a computer-readable storage medium and stores computer-executable instructions and data used by the processor 202.

In one embodiment, the memory 206 stores computer-executable instructions that cause the processor 202 to implement a method for displaying data elements. The computer-executable instructions stored by the memory comprise instructions for the application 140. In one embodiment, after delivery of the user interface 150 and data element script 180 to the client device 130 by the publisher server 110, the computer-executable instructions stored by the memory 206 further comprise instructions for the user interface 150, the data element player 160, the video player 170, and the data element script 180 as shown in FIG. 2.

The pointing device 214 may be a mouse, track ball, touch screen, or other type of pointing device, and is used in combination with the keyboard 210 to input data into the computer system 200. The graphics adapter 212 displays images and other information on the display 218. The network adapter 216 couples the computer system 200 to the network 190. Some embodiments of the computer 200 have different and/or other components than those shown in FIG. 2.

The types of computers 200 used by the entities of FIG. 1 can vary depending upon the embodiment and the processing power required by the entity. For example, a client device 130 that is a mobile telephone typically has limited processing power, a small display 218, and might lack a pointing device 214. A server providing a data element server 120, in contrast, might comprise multiple servers working together to provide the functionality described herein. Also, a server typically lacks hardware such as the graphics adapter 212, the display 218, and user input devices.

Some portions of the above description describe embodiments in terms of algorithms and symbolic representations of operations on information. For example, the description corresponding to FIGS. 2-5 relate to techniques that optimize and/or forecast data element usage. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to depict to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Software and firmware configurations of the modules and corresponding instructions described above can be stored in, for example, the storage device 208 and/or the memory 206 and can be executed by, for example, the processor 202, adapters 212, 216, controllers 220, 222, and/or multiple such devices operating in parallel.

FIG. 3 is an example user interface 150 enabling the creation and/or selection of data elements. In one technique, an owner, who may be a creator and/or producer of data elements, such as promotional data elements, and may be a buyer of promotional space, may manage or otherwise own one or more campaigns. In general herein, a user of the application 140 and/or client device 130 will be referred to as a "user," though the user may or may not be the owner 305 (the user may be, for example, an advertiser running campaign via client 130). A campaign may be a collection of one or more data elements that share a common idea or theme. As discussed above, a data element may comprise any computer-executable code whose execution may result in the presentation of text, images, and/or sounds to the user. Each data element may further comprise one or more creatives, each of which may correspond to at least a portion of the text, images, and/or sounds presented to the user. Finally, each creative may further comprise one or more media files, such as textual, image, and/or audio files.

As will be shown, techniques discussed herein may allow an owner to monitor data element group performance via one or more user interfaces 150. Owners may be able to forecast supply, pricing, and performance associated with data elements and/or data element groups. Owners may also be able to programmatically optimize budget allocation across data elements that perform the best according to one or more objectives and/or one or more constraints. Owners may further be able to manually optimize allocations of resources, and may allocate more resources, such as a budget, to better performing data elements. Owners may also be able to run reports against data element group performance, further enabling the selection of the most effective data elements for reaching a given set of objectives and constraints.

For example, data elements sharing similar optimization objectives and/or maximum effective cost per thousand impressions ("eCPM") may be grouped under one data element group. Forecasts of delivery and/or key performance indicators ("KPIs") may be determined and/or viewed at the data element group level as well at the level of individual data elements within the data element group. Budgets may be automatically allocated across multiple data elements within a given data element group 330.

As discussed herein, objectives and/or constraints may be optimized in order to meet or exceed the one or more objectives within any constraints. For example, objectives may be to hit a target eCPM for a given budget, to maximize target impressions, to maximize the completion rate, and/or to maximize the click-through rate. Any number of other objectives/goals/KPIs may be used.

FIG. 3 is an example user interface 300 configured for enabling creating and/or editing data elements that may be associated with a data element group. After selecting to create a data element in the application 140, such as one associated with a data element group, the user may be shown user interface 300. The status 305 of the data element may be shown as either paused or live.

The data element name 320 may be designated by the user. The data element group 315 associated with the data element may also be indicated. The data element may inherit pricing and optimization criteria, as well as any other restrictions or constraints set at the data element group level.

A start date and end date 320 (flight), in the case of published or promotional data elements, may also be displayed and input by the user. Flight dates of individual data elements may be prohibited from falling outside of the one or more flight dates of the parent data element group.

Objectives or goals 325 may also be designated at the data element level. However, if data element group optimization is activated, this section may be deactivated. A message may be provided to the user indicating that, to enable data element goal selection, the auto allocation across data elements 620 should be turned off. The data element group optimization algorithm may automatically allocate resources to a subset of the data element group.

Figure 4:
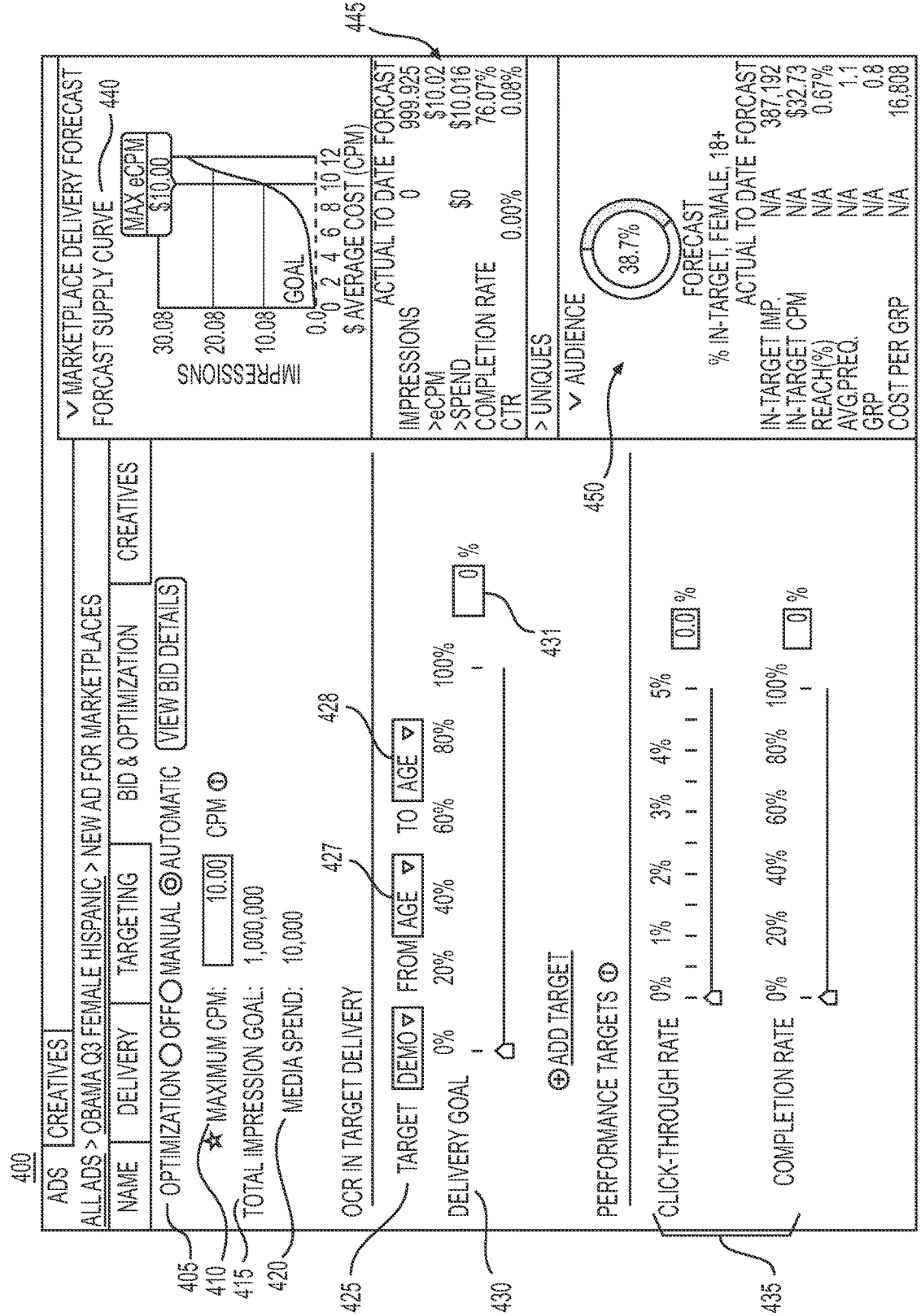
FIG. 4 is an example user interfaces displaying forecasted performance of data elements according to techniques presented herein.

As set forth above, the audience for a selected data element group or data element may be forecasted. FIG. 4 is an example of a user interface 400, which may allow for the creation, modification, and/or selection of data elements and attributes that may be associated with the creation of a data element group using a forecast. That is, based on the constraints and objectives that are input by a user, a forecast may be generated to determine a likelihood that selected performance objectives will be reached in a given flight based on the selected constraints. The forecast may be updated mid-flight to allow for the adjustment of a resource allocation strategy within the constraints entered by the user to increase the likelihood that the selected performance objectives will be reached. In particular, the mechanisms discussed below may provide users with the ability to forecast and optimize data elements against various metrics, including, but not limited to Nielsen Online Campaign Ratings ("NOCR" or "OCR"). In some embodiments, users may also be provided with optimized OCR in target delivery reports through various user interfaces.

Various metrics that may be provided to the user include the total number of impressions, the total number of unique impressions, male unique impressions (both in total and as a percentage of all unique impressions), female unique impressions (both in total and as a percentage as a whole), population base, reach percentage, average frequency, Gross Rating Point ("GRP"), and cost per GRP. The population may be the population within in targeted geographical area. The reach percentage may be the ratio of unique impressions in a geographical area to the population base of the geographical area. The average frequency may be the total number of impressions in a geographical area to the number of unique impressions in the geographical area. The GRP may be the ratio of impressions in a geographical area to the population base in a geographical area. The cost per GRP may be the ratio of total money spent in a geographical area during a campaign to the GRP of the geographical area.

Targeted demographic optimization using demographic data may be part of a resource allocation optimization strategy. Forecasting and optimization using demographic data may be independent from the OCR application. In some embodiments, users may specify multiple OCR target delivery goals having equal importance, or can specify OCR target delivery goals plus performance goals each having equal or otherwise differentially-weighted importance.

Only those demographics that users selected in audience targeting may be considered for forecasting and optimization. In some embodiments, only sites that users selected for in site targeting may be considered for forecasting and optimization. Inventory that indexes high on both user segments and sites may be given a high priority, while inventory that indexes high on either user segments or sites may be given relatively similar or equal priority.

The user may select an optimization status 405, which may reflect whether the resource allocation strategy will be optimized mid-flight based on demographic data retrieved from the demographic data server 126 (referring to FIG. 1). Optimization may be set to "off" by default. In some embodiments, optimization status 405 may not be switched from the "off" condition if, for example, the optimizer is not configured to be usable with demographic data from the demographic data server. Optimization may also be set to "manual," whereby the user may review demographic data or other data collected mid-flight, and manually adjust the resource allocation strategy. Optimization may still further be set to "automatic" whereby the resource allocation strategy is automatically adjusted based on the demographic data collected from the demographic data server or based on other metrics collected.

The user may also select a maximum eCPM 410, which, as indicated by the asterisk, may be a mandatory field. The eCPM 410 may be the effective cost per thousand impressions, and may be calculated by dividing total earning for data elements in the data element group by total number of impressions of data elements in the data element group in thousands. The maximum eCPM 410 may be enforced as a restrictive ceiling for any allocation of resources by the optimizer. In some embodiments, the optimizer may select an effective eCPM to be used to submit bids on data element placement that is less than the ceiling set by the maximum eCPM 410. That is, the optimizer may select an effective eCPM (an effective constraint) that is less than the maximum eCPM 410 if it determines that the user's selected objectives will still be met at an eCPM lower than the maximum eCPM. The use of the lowest possible eCPM to meet a user's selected objectives may give the optimizer more flexibility mid-flight to readjust the resource allocation strategy if, for example, the forecast was too optimistic, and the effective eCPM needs to be raised. Other benefits of this strategy include allocating resources in the most effective manner possible while still reaching selected performance objectives.

The user may also select a target demographic group 425 as a demographic group limitation, such as a first age setpoint 427, and a second age setpoint 428, though demographic group limitations may comprise any limitations as to the characteristics of the target users. The demographic group 425 may be selected as either "male," "female," or "all." The "all" selection may include both males and females. The first age setpoint 427 may be the lower bound of an age range specified within the target demographic of male, female, or all. The lower bound may be any value that is the lower bound of a target demographic range for which data is collected. The second age setpoint 428 may be the upper bound of the age range specified within the target demographic. The upper bound may be any value that is the upper bound of a target demographic range for which data is collected.

The user may then select a delivery goal 430 to be associated with the selected demographic group and first and second age setpoints. The delivery goal 430 may be a performance objective, such as, e.g., a percentage of in-target impressions relative to total impressions, a percentage of unique impressions relative to total impressions, or another suitable performance objective relative to the selected demographic group and first and second age setpoints. The user may associate a weighted percentage 431 with delivery goal 430, when additional delivery goals are added. The weighted percentage may default to 100% when only one delivery goal 430 is specified by a user.

The user may select additional performance targets that may be specific to the selected demographic-age groups, or that may apply to the entire data element group. In the example shown in FIG. 4, performance targets 435 include click through rate (CTR) and completion rate, although any other suitable performance targets may be included.

A forecast supply curve 440 may be provided, which may show a relationship between the number of impressions predicted based on eCPM. A table 445 may show both actual and forecasted values for one or more metrics, including, but not limited to impressions, eCPM, spend total, completion rate, and click through rate. As shown in FIG. 4, the actual-to-date values may be blank if such data is not available, for example, before the flight has started. As the flight begins, and as data becomes available for in-flight performance, the actual-to-date and forecasted values may be updated.

Still further, an "Audience" display 450 may be shown on user interface 400. The display 450 may show a representation of a forecasted performance objective relative to a selected demographic-age group. For example, as shown in FIG. 4, the selected demographic-age group is Females 18 and over, and the selected performance objective may be in-target impressions. In the example shown, the forecasted value of in-target impressions for Females 18 and over for this data element group at the selected constraint of $10.00 eCPM may be 38.7 percent. Other actual-to-date and forecasted values may be displayed in a table in display 450 including, but not limited to in-target CPM, reach percentage, average frequency, GRP, and cost per GRP. As the flight begins, and as data becomes available for in-flight performance, the actual-to-date and forecasted values shown in table 450 may be updated in a similar manner as described with reference to table 445.

The forecasting server 125, or other servers in system 100, may have varying degrees of confidence that two devices are operated by a common user. For example, if the forecasting server 125 had data about a user's website history on two devices, and the user logged into an e-mail or other account on both devices, the forecasting server would be able to know deterministically that the user used both devices. In such a case, the forecasting server 125 and/or demographic data server 126 might merge the two profiles into a single profile associated with a single user identifier. Alternatively, if a user has very similar usage patterns on two devices, the forecasting server 125 may make an assumption with a certain level of probability that the two users are the same. Users that are known deterministically may be called "deterministic users," while users that are known probabilistically may be called "probabilistic users." A sub-type of deterministic users may be primary device users, being users with one known device they use most often, and who may be called "primary device users."

Such deterministic and probabilistic information may be incorporated into the forecasting capabilities discussed herein. For example, owners and other users of the application 140 may be able to opt to receive an impression forecast that incorporates both deterministic and probabilistic users. Incorporating probabilistic user matches can help improve the forecasting estimates, such as impression forecasts.

Forecasts such as impression forecasts may be computed efficiently using bitsets. Each attribute being forecast may have a corresponding separate bitset, where every entry in the bitset may represent an impression. The bitsets may then be divided into partitions, where each partition represents the amount of data as an interval. The intervals may be, for example, 15-minute periods. Other data structures may be partly or completely employed in place of bitsets. For example, sketches such as HyperLogLog may be employed.

In one technique, user audience data may be ingested by one or more servers of the system 100, for example by the forecasting server 125. The forecasting server 125 may provide one or more user identifiers to the demographic data server 126, and may receive data about user activity. A query response from the demographic data server 126 may be categorized by attribute. A process, for example on the forecasting server 125, may read the user audience data logs and build up one or more data storage entities, such as bitsets, for each attribute (e.g., user audience, user location, user browser, segment, domain, site details, device details, cookies, etc.). When a query is later made in the application 140 by an owner or other user, the query may be performed on the bitsets to determine the forecast, for example the number of user impressions forecast.

One limitation of these techniques is that, if probabilistic users are determined using browser cookies, the cookies may vary across devices. As a result, one or more servers of the system 100 may determine that the same user across three devices is in fact three users.

In another embodiment, data stores, such as bitsets, may be combined for different user types (primary, deterministic, probabilistic). This may execute quickly, but might not compress easily due to the large size of each bitset, and may cause a large increase in memory usage. Running out of memory may further cause failures at various points in the system 100. Further, the large number of bitsets might make it too burdensome to pre-compute bitsets and store them in cache memory. In addition, some user events may correspond to uncategorizable users. These may be users that are not known either deterministically or probabilistically. If uncategorized data is made available in probabilistic data sets, users might see decreasing results when switching from primary to probabilistic forecasts. Further, users might specify a parameter in their forecast query that is not available in their chosen data set, which would cause the parameter to be ignored, and the resulting forecast estimate to be unusually high, or zero.

Another embodiment may remedy these possible problems. Audience target elements may be stored in records or logs for ingest/importation by category such as, for example, primary, deterministic, and probabilistic.

When an owner or other user of application 140 enters a query, elements in the query may be mapped to an expression that may query one or more relevant storage entities, such as bitsets. Rather than be a composite bitset, bitsets may be created for each attribute and each category of user (primary, deterministic, and/or probabilistic, for example). In this manner, memory may be saved by avoiding larger composite bitsets, while still maintaining a simple query system. The bitsets may be stored on forecasting server 125.

One or more servers of the system 100 may regularly ingest user data into storage entities in order to pre-build the queryable storage entities, such as bitsets. User impression logs may be received from, for example, data element server 120 by the forecasting server 125. For example, the demographic data server 126 may be queried by the forecasting server 125 to obtain audience membership for that user. Each primary device user element in the categorized response may include the impression in the bitset related to primary matches for those elements. Each deterministic user element may include the impression in the bitset for deterministic matches of that element. Further, each probabilistic user element may include the impression in the probabilistic impression. Uncategorized data, not linked to a primary, deterministic, or probabilistically identified user, may be include in any bitset, such as the bitset for primary device matches.

Once ingested into a storage entity such as a bitset, the data is now stored in a manner that may be efficiently queried. When the user sends a request, such as for an impression estimate, the system 100, for example the forecasting server 125, may map each of the query elements to the one or more corresponding storage entity, such as to one or more corresponding bitsets based on whether the user of the application 140 has designated deterministic, probabilistic, primary account users, etc., to be included in the results.

If the user selects only primary account targeting, then the query element may be mapped to one or more attributes corresponding to one or more primary account storage entities, such as a bitset of impressions for primary devices. If the user decides to query deterministic or probabilistic matches, the query may be constructed differently. Each element in the original user query may be mapped to a sub-expression. For example, if a certain element alpha is targeted with a deterministic setting, this query may be mapped to an expression that queries bitsets for both primary element alpha and deterministic element alpha. This may allow the user of the application 140 to see the forecast of, for example, all impressions from deterministically linked user data, as both primary devices as deterministically associated devices may be known deterministically. If the user of the application 140 chooses to include probabilistic matching as well, the query may be mapped to a sub-expression that queries primary, deterministic, and probabilistic bitsets. Using sub-expression mapping and attribute-specific data entities, the user of the application 140 may efficiently utilize probabilistic, deterministic, and primary forecasting capabilities based on the need. This may solve the compression issued discussed above with the combined bitset technique. Although more complicated expressions are generated with this technique, performance may actually be improved over the combined bitset technique because the performance gain due to less memory usage may outweigh the performance loss from the more complex expressions.

Techniques discussed above may bring memory footprint uncertainty. The categorized user segment data may be stored as, e.g., a bitset along with user events like impressions. This may lead to a very large number of attributes in the time partitions and runtime memory required to load and run bitwise operations. The process more intensely querying the demographic data server 125, or other servers of system 100, may create data bottlenecks or reliability problems. The increased number of data entities may further impact the performance of the system 100. Further, forecasts 440 and/or 450 may be adversely affected if there is not enough user segment data available. If the system 100 runs out of memory, bid sampling may be scaled down.

Techniques discussed above may also create problems as large amounts of data are ingested from, for example, the demographic data server 126. Data ingestors may be coded to turn off in the event of ingestion process failures, so as to minimize the risk to other servers in the system 100. Large amounts of cached data may grow over time and cause memory errors. To guard against this, timeouts may be set on any memory caches. Historical analysis of the segments and frequency of appearing in data element server logs may be performed to determine an optimal value of the cache size and timeout period. These two parameters may be configurable, so that the application 140 may scale the values up or down based upon current and/or predicted traffic levels. For example, the cache may be limited both the maximum amount of entries it can contain and the timeout before individual entries are dropped from the cache. Because some elements may be very frequently used while others may be infrequently used, there may be diminishing returns to storing everything in the cache. Thus, a cache size value may be chosen to provide a good tradeoff between memory usage and cache hit rate. The size chosen may be experimentally based on the implementation.

Additionally, data records associated with user events stored on, for example, forecasting server 125, may need to be associated. Mapping files may be created and made available on the system 100, for example on the forecasting server 125. New mapping files may be created at predetermined time intervals, for example every day. If the mapping process fails to generate a mapping file, the system 100 may automatically use the most recent available mapping file.

Figure 5:
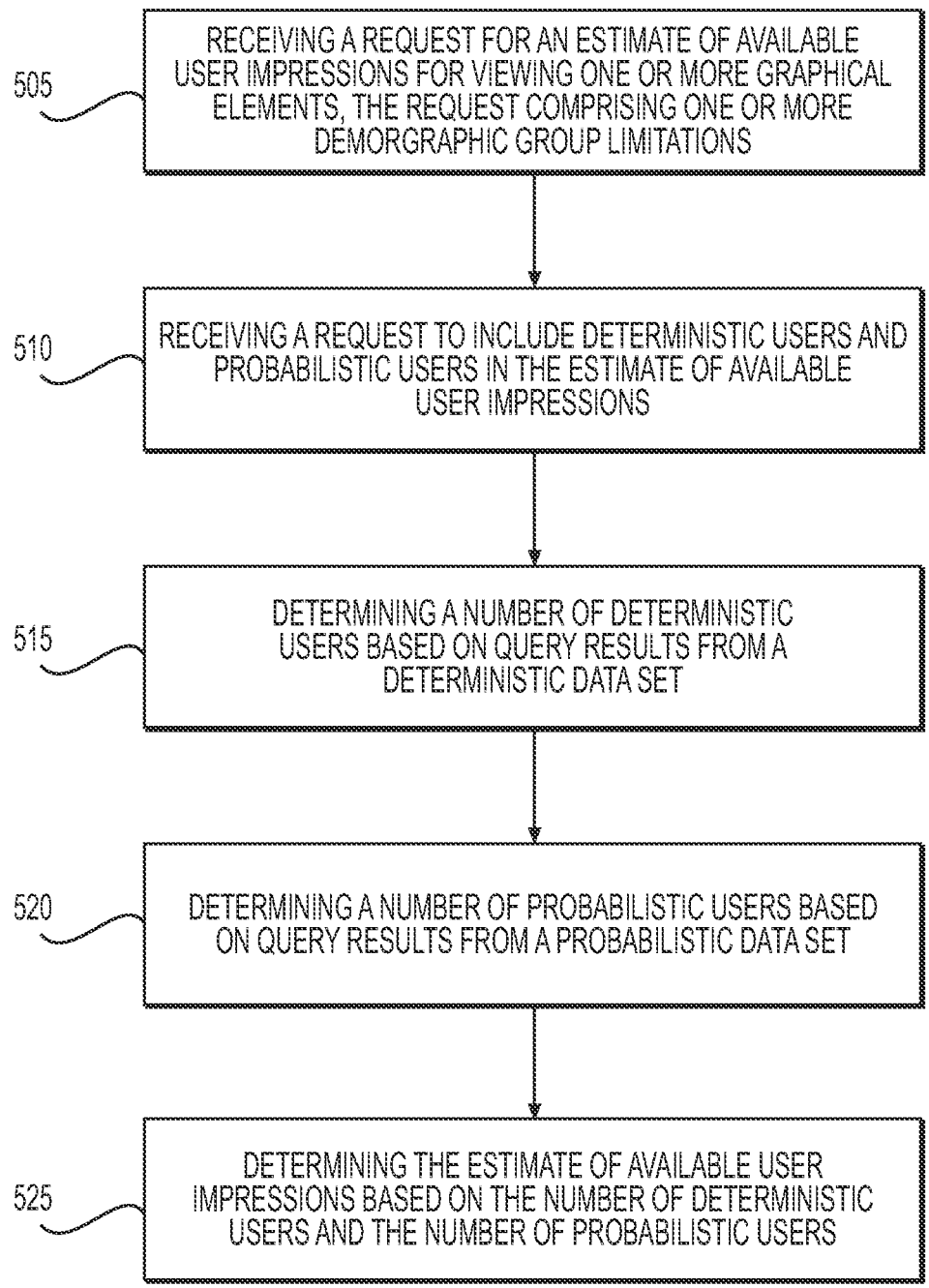
FIG. 5 is a flow diagram illustrating an example method for determining an estimate of available user impressions on a network.

FIG. 5 is a flow diagram 500 illustrating an example method for determining an estimate of available user impressions on a network. At step 505, a request may be received for an estimate of available user impressions for viewing one or more graphical elements, the request comprising one or more demographic group limitations. At step 510, a request may be received to include deterministic users and probabilistic users in the estimate of available user impressions. At step 515, a number of deterministic users may be determined based on query results from a deterministic user data set. At step 520, a number of probabilistic users may be determined based on query results from a probabilistic user data set, and at step 525 the estimate of available user impressions may be determined based on the number of deterministic users and the number of probabilistic users.

Techniques presented herein may provide a differentiated buying tool allowing one or more owners to purchase space for promotional data elements that may eliminate substantial manual work and provide real-time optimal allocation of resources to data elements. In addition, the optimization algorithm may work recursively up or down the object hierarchy, thus increasing the efficiency of optimization according to objectives and/or constraints. While many settings discussed herein may be able to be set at the data element group level, these same settings may be set at the campaign level and/or data element level, unless expressly stated otherwise herein. More generally, any setting that may be configured at any level of the object hierarchy may also be configured at any other level of the object hierarchy, unless expressly stated otherwise herein. All user interfaces shown herein, or combinations thereof, may be present in various embodiments, and may be presented to one or more users. All features discussed herein may have associated security requirements before they may be used. For example, different users of the application may have different levels of privileges, allowing them to access differing features of the application. In addition, many steps of techniques discussed herein are disclosed in a particular order. In general, steps discussed may be performed in any order, unless expressly stated otherwise.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for systems and methods for optimizing data element usage through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for determining an estimate of available user impressions on a network and allocating resources, the method comprising:
   receiving, at a forecasting server, resources to be allocated to one or more user impressions;
   receiving, at the forecasting server, a request for an estimate of available user impressions for viewing one or more media elements, the request including one or more viewer demographic group limitations;
   generating, at a storage entity, queryable storage entities including deterministic user bitsets and probabilistic user bitsets;
   mapping, by the forecasting server, a query to the deterministic user bitsets or probabilistic user bitsets;
   determining, by the forecasting server, an estimate of available user impressions based on the one or more viewer demographic group limitations and the query to the deterministic user bitsets or probabilistic user bitsets;
   automatically allocating the resources to available user impressions based on the determined estimate of available user impressions;
   grouping one or more of the available user impressions that were allocated resources based on key performance indicators; and
   optimizing the remaining allocation of resources for a group of the one or more available user impressions based on comparing actual available user impressions with the determined estimate of available user impressions.

2. The method of claim 1, further comprising:
receiving user impression data associated with one or more primary device users viewing one or more media elements on the network;
receiving, for the one or more primary device users, demographic group membership data, the demographic group membership data comprising probabilistic group membership data and deterministic group membership data;
associating, for each of the one or more primary device users, the user impression data with the demographic group membership data;
adding the probabilistic group membership data to the probabilistic user bitset; and
adding the deterministic group membership data to the deterministic user bitset.

3. The method of claim 1, further comprising:
adding the one or more deterministic user bitsets to a combined bitset;
adding the one or more probabilistic user bitsets to the combined bitset; and
determining the estimate of available user impressions based on query results from the combined bitset.

4. The method of claim 1, further comprising:
receiving a request to include one or more primary device users in the estimate of available user impressions;
determining a number of primary device users based on query results from a primary device user bitset; and
determining the estimate of available user impressions based on the query to the deterministic user bitsets or probabilistic user bitsets, and the number of primary device users.

5. The method of claim 4, further comprising:
receiving, for each of a plurality of users viewing one or more media elements on the network, unknown group data for which group membership is unknown; and
adding the unknown group data to the primary device user bitset.

6. The method of claim 1, wherein the deterministic user bitsets and the probabilistic user bitsets are limited to data corresponding to the one or more viewer demographic group limitations.

7. The method of claim 1, wherein the probabilistic users comprise users that have been non-deterministically identified based upon user device data, user network data, and/or user behavior data.

8. A system for determining an estimate of available user impressions on a network and allocating resources, the system comprising:
a data storage device storing instructions for determining an estimate of available user impressions on a network; and
a processor configured to execute the instructions to perform a method comprising:
receiving, at a forecasting server, resources to be allocated to one or more user impressions;
receiving, at the forecasting server, a request for an estimate of available user impressions for viewing one or more media elements, the request including one or more viewer demographic group limitations;
generating, at a storage entity, queryable storage entities including deterministic user bitsets and probabilistic user bitsets;
mapping, by the forecasting server, a query to the deterministic user bitsets or probabilistic user bitsets;
determining, by the forecasting server, an estimate of available user impressions based on the one or more viewer demographic group limitations and the query to the deterministic user bitsets or probabilistic user bitsets;
automatically allocating the resources to available user impressions based on the determined estimate of available user impressions;
grouping one or more of the available user impressions that were allocated resources based on key performance indicator; and
optimizing the remaining allocation of resources for a group of the one or more available user impressions based on comparing actual available user impressions with the determined estimate of available user impressions.

9. The system of claim 8, the method further comprising:
receiving user impression data associated with one or more primary device users viewing one or more media elements on the network;
receiving, for the one or more primary device users, demographic group membership data, the demographic group membership data comprising probabilistic group membership data and deterministic group membership data;
associating, for each of the one or more primary device users, the user impression data with the demographic group membership data;
adding the probabilistic group membership data to the probabilistic user bitset; and
adding the deterministic group membership data to the deterministic user bitset.

10. The system of claim 8, wherein the system for generating a combined bitset is further configured for:
adding the one or more deterministic user bitsets to a combined bitset;
adding the one or more probabilistic user bitsets to the combined bitset; and
determining the estimate of available user impressions based on query results from the combined bitset.

11. The system of claim 8, the system is further configured for:
receiving a request to include one or more primary device users in the estimate of available user impressions;
determining a number of primary device users based on query results from a primary device user bitset; and
determining the estimate of available user impressions based on the query to the deterministic user bitsets or probabilistic user bitsets, and the number of primary device users.

12. The system of claim 11, the system is further configured for:
receiving, for each of a plurality of users viewing one or more media elements on the network, unknown group data for which group membership is unknown; and
adding the unknown group data to the primary device user bitset.

13. The system of claim 8, wherein the deterministic user bitsets and the probabilistic user bitsets are limited to data corresponding to the one or more viewer demographic group limitations.

14. The system of claim 8, wherein the probabilistic users comprise users that have been non-deterministically identified based upon user device data, user network data, and/or user behavior data.

15. A non-transitory computer readable medium storing instructions that, when executed by a processor, cause the processor to perform a method of determining an estimate of available user impressions on a network and allocating resources, the method comprising:
   receiving, at a forecasting server, resources to be allocated to one or more user impressions;
   receiving, at the forecasting server, a request for an estimate of available user impressions for viewing one or more media elements, the request including one or more viewer demographic group limitations;
   generating, at a storage entity, queryable storage entities including deterministic user bitsets and probabilistic user bitsets;
   mapping, by the forecasting server, a query to the deterministic user bitsets or probabilistic user bitsets;
   determining, by the forecasting server, an estimate of available user impressions based on the one or more viewer demographic group limitations and the query to the deterministic user bitsets or probabilistic user bitsets;
   automatically allocating the resources to available user impressions based on the determined estimate of available user impressions;
   grouping one or more of the available user impressions that were allocated resources based on key performance indicators; and
   optimizing the remaining allocation for a group of the one or more available user impressions of resources based on comparing actual available user impressions with the determined estimate of available user impressions.

16. The computer readable medium of claim 15, further comprising:
   receiving user impression data associated with one or more primary device users viewing one or more media elements on the network;
   receiving, for the one or more primary device users, demographic group membership data, the demographic group membership data comprising probabilistic group membership data and deterministic group membership data;
   associating, for each of the one or more primary device users, the user impression data with the demographic group membership data;
   adding the probabilistic group membership data to the probabilistic user bitset; and
   adding the deterministic group membership data to the deterministic user bitset.

17. The computer readable medium of claim 15, further comprising:
   adding the one or more deterministic user bitsets to a combined bitset;
   adding the one or more probabilistic user bitsets to the combined bitset; and
   determining the estimate of available user impressions based on query results from the combined bitset.

18. The computer readable medium of claim 15, further comprising:
   receiving a request to include one or more primary device users in the estimate of available user impressions;
   determining a number of primary device users based on query results from a primary device user bitset; and
   determining the estimate of available user impressions based on the query to the deterministic user bitsets or probabilistic user bitsets, and the number of primary device users.

19. The computer readable medium of claim 18, further comprising:
   receiving, for each of a plurality of users viewing one or more media elements on the network, unknown group data for which group membership is unknown; and
   adding the unknown group data to the primary device user bitset.

20. The computer readable medium of claim 15, wherein the deterministic user bitsets and the probabilistic user bitsets are limited to data corresponding to the one or more viewer demographic group limitations.

* * * * *